US012761361B1

(12) United States Patent
Cohoon et al.

(10) Patent No.: US 12,761,361 B1
(45) Date of Patent: Oct. 13, 2026

(54) DYNAMIC RESOLUTION TIME OF FLIGHT DEPTH SENSING

(71) Applicant: Meta Platforms Technologies, LLC, Menlo Park, CA (US)

(72) Inventors: Gregory Cohoon, Sunnyvale, CA (US); Hod Finkelstein, Albany, CA (US); Harish Venkataraman, Buckley, WA (US); Michael Hall, Bellevue, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 954 days.

(21) Appl. No.: 18/149,896

(22) Filed: Jan. 4, 2023

Related U.S. Application Data

(60) Provisional application No. 63/403,222, filed on Sep. 1, 2022.

(51) Int. Cl.

| | |
|---|---|
| ***G01C 3/08*** | (2006.01) |
| ***G01B 11/22*** | (2006.01) |
| ***G01S 7/4865*** | (2020.01) |
| ***G01S 17/894*** | (2020.01) |
| ***H04N 23/56*** | (2023.01) |
| ***H04N 23/74*** | (2023.01) |
| ***H04N 23/958*** | (2023.01) |

(52) U.S. Cl.
CPC ............ *G01S 17/894* (2020.01); *G01B 11/22* (2013.01); *G01S 7/4865* (2013.01); *H04N 23/56* (2023.01); *H04N 23/74* (2023.01); *H04N 23/958* (2023.01)

(58) Field of Classification Search
CPC ... G01S 17/894; G01S 7/4865; H04N 23/958; H04N 23/74; H04N 23/56; G01B 11/22
See application file for complete search history.

(56) References Cited

U.S. PATENT DOCUMENTS

| | | | | |
|---|---|---|---|---|
| 2020/0264311 | A1* | 8/2020 | Le Dortz | G01S 17/36 |
| 2021/0258457 | A1* | 8/2021 | Akkaya | H04N 23/56 |
| 2022/0164971 | A1* | 5/2022 | Hegarty | G06V 10/94 |

* cited by examiner

*Primary Examiner* — Mark Hellner
(74) *Attorney, Agent, or Firm* — FREESTONE INTELLECTUAL PROPERTY LAW PLLC; Aaron J. Visbeek

(57) ABSTRACT

A depth camera assembly (DCA) is described. The DCA includes a projector, a sensor, and a controller. The projector is configured to dynamically illuminate one or more regions of a local area. The sensor is configured to detect light from the illuminated one or more regions using one or more subsets of a plurality of light sensors. The controller is configured to instruct the projector to illuminate a first region of the local area, and determine a first subset of the one or more subsets. The controller is configured to instruct the sensor to use the first subset to detect light, and the first subset captures light from a first portion of the first region of the local area. The controller is configured to determine depth information for the first region based in part on the detected light from the first portion of the first region.

15 Claims, 6 Drawing Sheets

DYNAMIC RESOLUTION TIME OF FLIGHT DEPTH SENSING

CROSS-REFERENCE TO RELATED APPLICATIONS

This application claims the benefit of U.S. Provisional Application No. 63/403,222, filed Sep. 1, 2022, which is incorporated by reference in its entirety.

FIELD OF THE INVENTION

This disclosure relates generally to depth cameras, and more specifically to dynamic resolution time-of-flight depth sensing.

BACKGROUND

Time-of-flight (ToF) measures distance to a target based on the time delta between when light is emitted from the light source and when the light returns back to the sensor due to reflection. Conventional ToF depth systems typically illuminate an entire local area, and determine depth for the entire local area. However, conventional ToF depth systems include sensor arrays that have a limit in the number of sensors that can capture data for a particular time interval. This limit along with illumination of the entire local area impairs high resolution depth determination for the local area as well as high precision position determination of moving targets.

SUMMARY

A depth camera assembly (DCA) is described herein. The DCA includes a projector, a sensor, and a controller. A local area of the DCA is generally divided into a plurality of regions. The projector may be configured to dynamically illuminate one or more regions of a local area with one or more pulses of light (e.g., in different time windows). The sensor may be configured to detect light from the illuminated one or more regions of the local area using at least one subset of a plurality of subsets of a plurality of light sensors, and each subset is associated with detecting light from different portions of an illuminated region. The controller may associate a respective target resolution for depth information for regions of the local area to be illuminated. The controller may instruct the projector to illuminate specific regions of the plurality of regions. The controller may determine one or more subsets of the plurality of light sensors to detect light from an illuminated region over different time intervals. The controller may determine depth information for the region based on the light detected by the one or more subsets of the plurality of light sensors and a depth determination technique (e.g., direct ToF).

In some embodiments, a method is described. The method comprises illuminating a first region of a local area. The method includes selecting a first subset of a plurality of light sensors, the first subset of the plurality of light sensors configured to detect light from the first region of the local area and light sensors not in the first subset are inactive. The method further includes detecting light from a first portion of the first region of the local area using the first subset of the plurality of light sensors, and determining depth information for the first region based in part on the detected light from the first portion of the first region.

In some embodiments, a non-transitory computer-readable storage medium is described. The storage medium comprises stored instructions, the instructions when executed by a processor of a depth camera assembly (DCA), causing the DCA to: illuminate a first region of a local area, and select a first subset of a plurality of light sensors, the first subset of the plurality of light sensors configured to detect light from the first region of the local area and light sensors not in the first subset are inactive. The instructions also cause the DCA to detect light from a first portion of the first region of the local area using the first subset of the plurality of light sensors, and determine depth information for the first region based in part on the detected light from the first portion of the first region.

In some embodiments, a DCA is described. The DCA includes a projector, a sensor, and a controller. The projector is configured to dynamically illuminate one or more regions of a local area. The sensor is configured to detect light from the illuminated one or more regions of the local area using one or more subsets of a plurality of light sensors. The controller is configured to instruct the projector to illuminate a first region of the local area, and determine a first subset of the one or more subsets of the plurality of light sensors. The controller is also configured to instruct the sensor to use the first subset of the plurality of light sensors to detect light, wherein the first subset of the plurality of light sensors captures light from a first portion of the first region of the local area, and determine depth information for the first region based in part on the detected light from the first portion of the first region.

Figure 1:
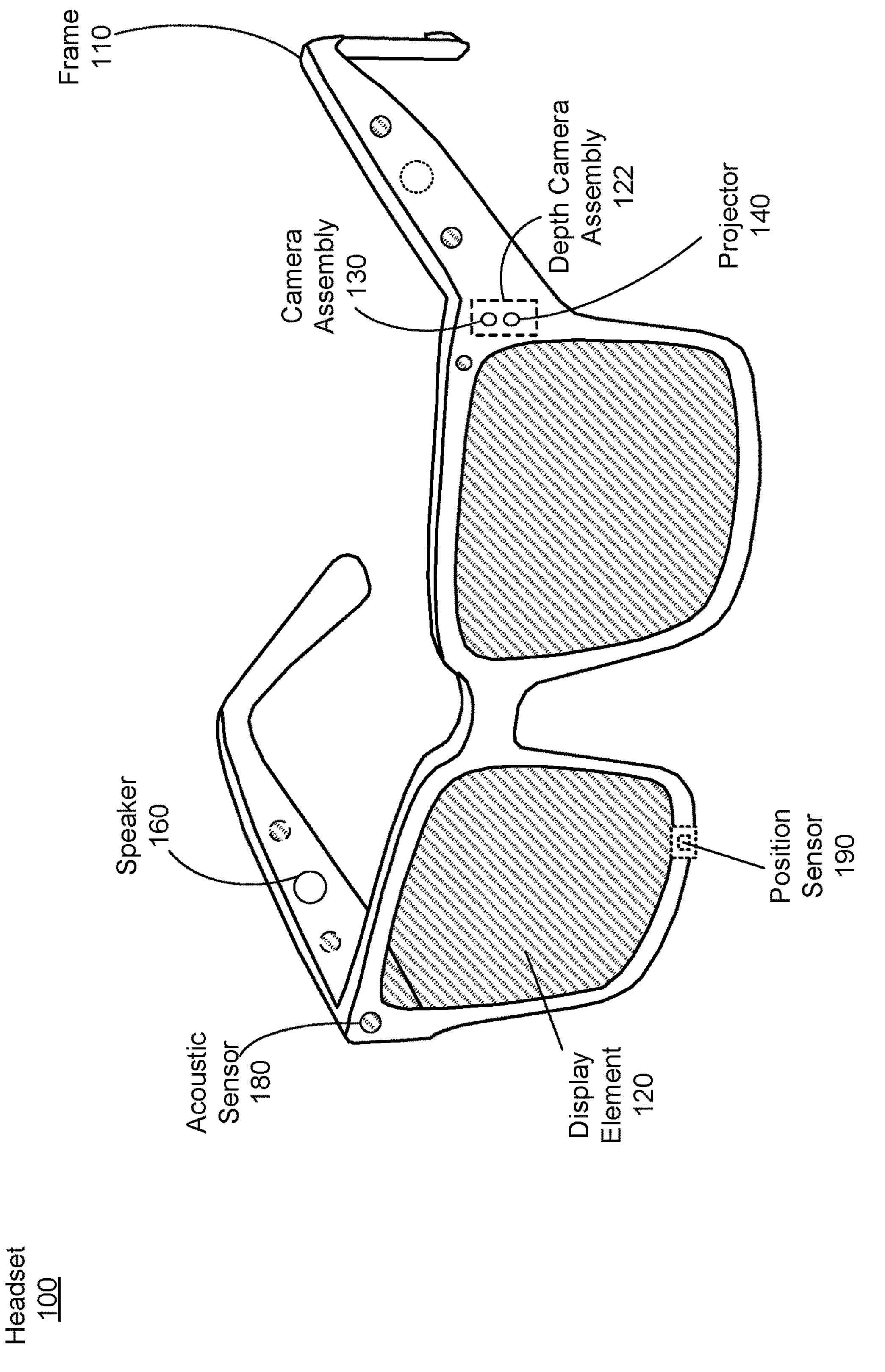
FIG. 1 is a diagram of a headset, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A depth camera assembly (DCA) is described herein. The DCA may be integrated into a device (e.g., tablet, smartphone, laptop computer, headset, etc.). The DCA includes a projector, a camera assembly, and a controller. A local area of the DCA is generally divided into a plurality of regions.

The projector may be configured to dynamically illuminate one or more regions of the plurality of regions with one or more pulses of light (e.g., 1000 pulses for a given time window). In this manner an "illuminated region" refers to a region that is subject to one or more pulses of light from the projector for a given time window. For example, the projector may illuminate one region over a first time window with one or more pulses of light and illuminate the same region or a different region with one or more pulses of light in a subsequent time window. In some embodiments, a pulse in this context refers to amplitude-modulated light where two states are defined—a high state when light intensity is above a threshold and a low state when light intensity is below a threshold.

The camera assembly is configured to detect light pulses emitted from the projector that have reflected from objects within the local area. The camera includes a sensor that includes a plurality of light sensors (e.g., single photon avalanche diodes). For a given time window, the sensor may be configured to detect light from the illuminated region of the local area using one or more subsets of a plurality of light sensors. Each subset is associated with detecting light from different (or partially overlapping) portions of an illuminated region.

The controller controls components of the DCA. The controller may associate a respective target resolution for depth information for regions of the local area to be illuminated. The controller may instruct the projector to illuminate, one at a time, specific regions of the plurality of regions. The controller may determine one or more subsets of the plurality of light sensors to detect light from an illuminated region over different time intervals (of the given time window the region is illuminated). The controller determines depth information (e.g., using a dToF depth determination technique) for the region based on the light detected by the one or more subsets of the plurality of light sensors.

Conventional dToF depth systems typically illuminate an entire local area or consistently illuminate a sub-portion of it, and determine depth for the entire local area or its illuminated sub-portion. Alternately, some dToF system repeatedly scan a local area, e.g., using mechanical rotation, a Micro-Electro-Mechanical-System (MEMS) mirror, or electronically. But broad illumination can result in a lower overall resolution and increased power requirements. Predefined scanning patterns also result in high power consumption because illumination power must account for the dimmest possible target which may be present, regardless of whether it is actually present. Moreover, conventional sensors for dToF depth systems have limits on the number of pixels that can capture data for a particular time interval. For example, for a given sensor (can vary by manufacturer), if the sensor has X number of pixels, only M pixels may be able to capture light for the particular time interval, wherein X and M are integers, and M is less than X. For example, state of the art SPAD sensors may contains tens of thousands of SPAD pixels but only a few tens may be activated at any one time. The reason is the large silicon area and electrical power required to digitize each avalanche event (e.g., due to the detection of a photon), as well as the memory arrays (and associated read-write operation) required to store each pixel's times-of-arrival histogram, prior to histogram generation and peak detection. This limit along with concurrent illumination of large portions of the local area impairs high resolution depth determination for the local area. In contrast, the DCA described herein adaptively and dynamically selects the illumination power and the resolution one of each region in the local area. For each illuminated region, it sequentially captures light using one or more different subsets of light sensors to reach a target level of resolution for determined 3D information for the illuminated region. Accordingly, instead of trying to determine depth over the entire local area—which can be relatively power and resource intensive—the DCA determines depth information for specific regions of the local area over different time windows, and at potentially different levels of resolution. In this manner, the DCA may have reduced power/bandwidth requirements relative to conventional dToF depth systems. Moreover, by being able to dynamically and/or adaptively vary levels of resolution of depth information for different regions, the DCA is able to match resolution of depth information (and by extension use of DCA resources) to importance of objects in a local area. For example, for typical AR/VR applications it is useful to have more resolution near edges of objects or on facial features, and these occupy a small portion of the overall field.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110 and a depth camera assembly (DCA) 122, and may include, among other components, a display assembly including one or more display elements 120, an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA 122 determines depth information for a portion of a local area surrounding the headset 100. The DCA 122 includes a camera assembly 130, a projector 140. In some embodiments, the projector 140 illuminates a portion of the local area with one or more pulses of light. The light may be, e.g., structured light (e.g., dot pattern, bars, etc.) in the near infrared (NIR), in Short Wave Infrared (SWIR), or be a sufficiently uniform flash, etc. The camera assembly 130 detects light from the portion of the local area that include the light from the projector 140. The controller computes depth information for the portion of the local area using the detected light and a time-of-flight depth determination technique. The depth determination technique may be, e.g., direct ToF (dToF) or indirect ToF (iToF). Operation of the DCA 122 is described in detail below with regard to FIGS. 2-5.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer may couple to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the camera assembly 130 of the DCA 122 may also function as the PCA. The images captured by the PCA and the depth information determined by the DCA 122 may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 5.

Figure 2:
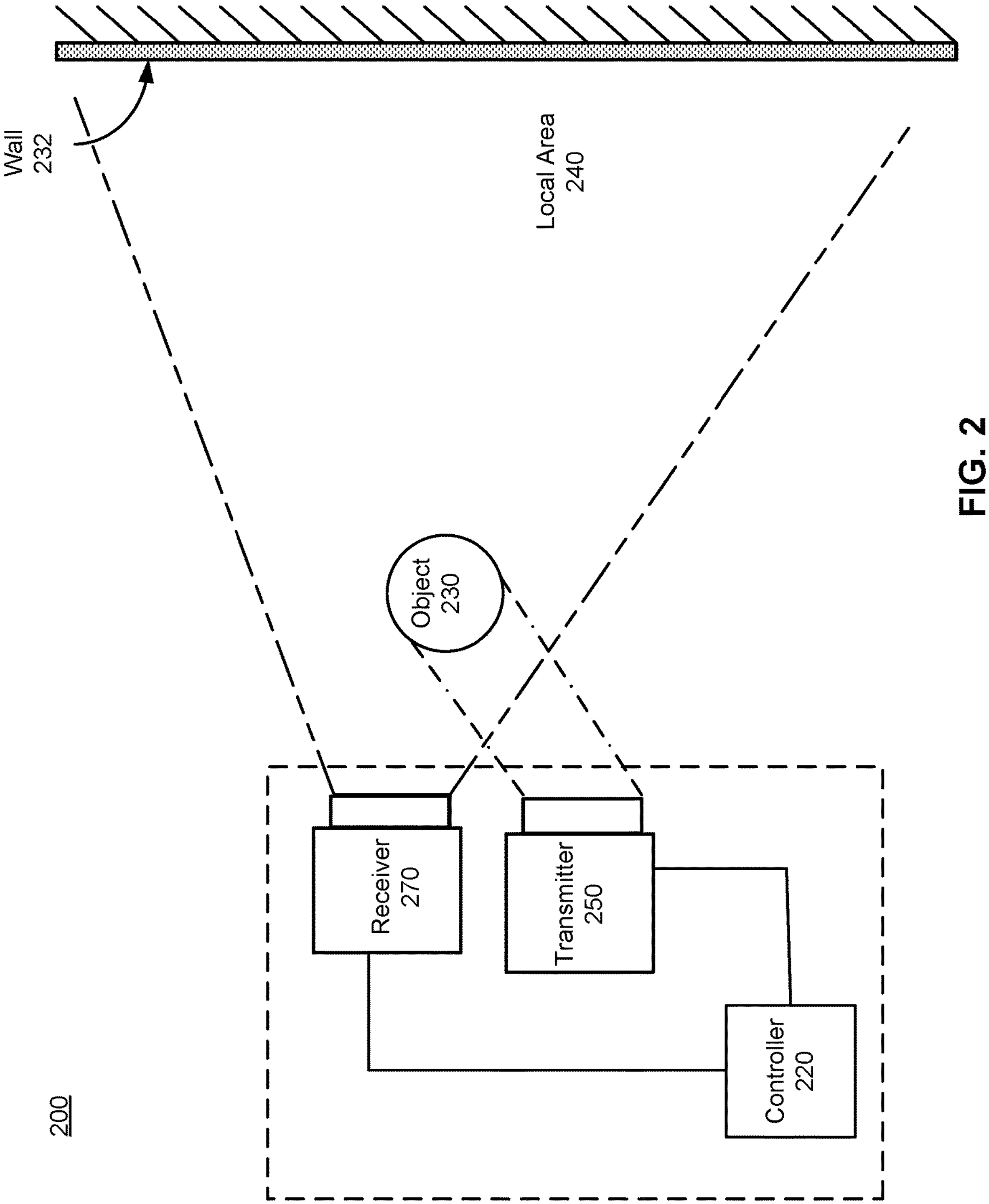
FIG. 2 is a cross-section of a depth camera assembly, in accordance with one or more embodiments.

FIG. 2 is a cross-section of a DCA 200, in accordance with one or more embodiments. As shown in FIG. 2, the DCA 200 includes a transmitter 250, a receiver 270, and a controller 220. The DCA 122 may be an embodiment of the DCA 200. The DCA 200 determines depth information for one or more objects (e.g., object 230, wall 232) that are within a local area 240. The local area 240 may be divided up into a plurality of smaller regions.

The transmitter 250 is configured to dynamically illuminate the one or more regions of the local area 240 with one or more pulses of light in accordance with instructions from the controller 220. In some embodiments, the transmitter 250 may be referred to as a projector. In some embodiments, the transmitter 250 illuminates the one or more regions one at a time (e.g., sequentially over different time windows). In other embodiments, the transmitter 250 may illuminate multiple regions over a same time window. The projector 140 may be an embodiment of the transmitter 250. The transmitter 250 includes a source array (not shown). The source array includes a plurality of light sources that emit light in an optical band. In some embodiments, the source array is powered by a laser driver. The optical band may be, e.g., the infrared or near-infrared (collectively referenced to as "IR"). Examples of light sources include but are not limited to: light-emitting diodes (LEDs), micro light-emitting diodes (pLEDs), micro super luminescent diodes (pSLDs), vertical-cavity surface-emitting lasers (VCSELs), micro resonant cavity light-emitting diodes (pRCLEDs), edge emitting lasers (EELs), some other light source that emits light, or some combination thereof. Alternatively, the transmitter 250 includes a single light source emitting the pulses of light. In some embodiments, the transmitter 250 includes a lens assembly that in-couples light from the source array and projects the light over at least a portion of the local area 240. The lens assembly may include for example, one or more diffractive optical elements (e.g., grating), collimation optics (e.g., collimator, microlens array, etc.), diffusing optics, meta-lenses, some other optical element(s) that facilitate projecting the light over some or all of the local area, or some combination thereof. The transmitter 250 may be able to emit light in different bands. Furthermore, the transmitter 250 may be configured to emit different patterns of light, e.g., structured light (e.g., dot pattern, bar pattern, etc.), a flash (e.g., flood illumination), etc.

The receiver 270 is configured to detect light emitted that is reflected from objects an illuminated region of the local area 240. The camera assembly 130 may be an embodiment of the receiver 270. In some embodiments, the transmitter 270 may be referred to as a camera assembly. The receiver 270 includes a sensor. The sensor may be an integrated circuit (IC). The sensor includes a plurality of light sensors. In some embodiments, the plurality of light sensors are divided into a plurality of pixels. In some instances, each pixel includes a single light sensor. In other instances, each pixel is a macro pixel that includes include a plurality of light sensors. The plurality of light sensors may be, e.g., single-photon-avalanche diodes (SPADs), photodetectors, gated charge coupled devices (CCDs), photogates, or some combination thereof. The sensor is sensitive to light in the optical band emitted by the transmitter 250 (e.g., IR). The plurality of light sensors may be arranged on the sensor in a variety of geometries. Some example geometries are described below with regard to FIG. 4. The receiver 270 may include a readout IC. The readout IC) may be part of the sensor. In other embodiments, the readout IC may be a different die which may be bonded (e.g., wafer bonded) to the sensor die.

For a given time window, the sensor may be configured (e.g., by the controller 220) to detect light from one or more portions of the illuminated region using one or more subsets of a plurality of light sensors. Note, while a given subset is active, light sensors that are not part of the given subset are inactive (i.e., do not detect light). Each subset is associated with detecting light from different portions of an illuminated region. In some embodiments, there are no common light sensors between different subsets (e.g., there is no overlap in the portions of the illuminated region the subsets correspond to). For example, in embodiments, where the plurality of light sensors form a grid. One subset could form a checkerboard pattern, and a second subset could form an inverse of the checkerboard pattern. In some embodiments, there are one or more common light sensors between different subsets (e.g., may result in some overlap in the portions of the illuminated region the subsets correspond to). Note that by using multiple subsets that cover different portions (which may be overlapping) of the illuminated region, the DCA 200 is able to increase a resolution of depth information determined for the illuminated region. In this manner, the DCA 200 is able to dynamically control resolution for depth information determined for different regions of the local area. In some embodiments, a number of light sensors in a subset is less than a total number of sensors of the plurality of light sensors. In some embodiments, the number is based in part on a power budget of the DCA 200. In some embodiments, the number is based in part on a restriction of the sensor that limits a maximum size of a subset.

In some embodiments, the receiver 270 also includes a lens assembly that focuses light (e.g., the light pulses of light emitted by the transmitter 250 that are reflecting/scattering off objects within the local area 240) from the one or more illuminated regions onto the sensor. The lens assembly may also include one or more filters (e.g., an IR filter) for blocking at least portion of ambient light from reaching the sensor of the receiver 270. In some embodiments, the receiver 270 may also include a spectral sensor that is configured to transmit light in the band of light emitted by the transmitter 250 and reject significant portions of light outside the band of the light emitted by the transmitter 250.

The controller 220 controls components of the DCA 200. The controller 220 may include one or more processors and/or use one or more other processors that are external to the controller 220. Some embodiments of the controller 220 have different functions than those described here. Similarly, functions can be distributed among the components in different manners than described here. For example, some functions of the controller 220 may be performed external to the DCA 200.

The controller 220 identifies one or more regions of the plurality of regions of the local area 240 for which to determine depth information. In some embodiments, the one or more regions may be all of the plurality of regions. In other embodiments, it may be some subset of the plurality of regions (e.g., only regions which include objects).

The controller 220 determines a target level of resolution for depth information to be determined for each of the identified one or more regions. The target level of resolution may be based on, e.g., a location of the region relative to the DCA 200, a movement speed of an object within the region relative to the DCA 200, etc. For example, if the object 230 is a hand of a user of the DCA 200. Note that the hand would be relatively close to the DCA 200 compared to the wall 232. Accordingly, the controller 220 would assign a higher target level of resolution for depth determination for any region including the object 230 than for regions that include the wall 232. Alternatively, if the object 230 is moving quickly, the controller 220 may determine that there is not enough time to determine depth information using a number of subsets associated with the target level of resolution, and instead opt for determining depth at a lower lateral resolution (e.g., using a single subset) until the object slowed down. In this manner, the controller 220 may be able to balance resolution of depth information against potential blurring caused by object motion. Note that the determined level of resolution may be for radial (or depth) resolution, tangential (or lateral and height) resolution, or some combination thereof. And that in some embodiments, the level of resolution may be different for radial (or depth) resolution than for tangential (or lateral and height) resolution. Note that lateral motion at a given velocity translates to a higher angular velocity at closer range than at longer range, accordingly, the DCA 200 may have finer lateral resolution for nearer targets.

The controller 220 is configured to instruct the transmitter 250 to illuminate one or more of the identified regions. In some embodiments, the controller 220 instructs the transmitter 250 to illuminate each of the one or more identified regions (with one or more pulses of light) one at a time over subsequent time windows. In other embodiments, the controller 220 may instruct the transmitter 250 to illuminate a plurality of regions during a same time window.

A time window may include one or more time intervals. During a particular time interval a single subset of the plurality of light sensors is active (i.e., configured to detect light), and light sensors not in the single subset are inactive (i.e., not detecting light). The length of the time window and the one or more time intervals may vary (e.g., to ensure proper exposure).

For each of the identified regions, the controller 220 is configured to determine one or more subsets of the plurality of light sensors to use to detect light. The controller 220 may use the target level of resolution for a region to determine the one or more subsets. For example, if the target level of resolution is relatively high, a plurality of different subsets may be used that detect light from different portions of the region such that light is detected from substantially all of the region (and in some cases one or more light sensors may be common to multiple subsets of the plurality of different subsets). Likewise, if the target level of resolution is relatively low, the controller 220 may select a single subset such that light from a relatively smaller portion (e.g., 50%) of the region is detected. Accordingly, for a time window, the controller 220 can instruct the sensor (or receiver 270) to detect light using the identified one or more subsets for that time window over one or more time intervals.

The controller 220 is configured to determine depth information for the illuminated regions. For a given time window over which a region is illuminated with one or more pulses of light, the controller 220 uses light detected by the one or more subsets for one or more portions of the illuminated region (e.g., in subsequent time intervals within the time window) to determine depth information for the region. The controller determines depth information for the region using the light detected from the one or more subsets and a time-of-flight depth determination technique. The depth determination technique may be, e.g., dToF or iToF.

For example, in dToF, range may be calculated by collecting times of detected avalanches, storing them in memory bins corresponding to time bins, and then reading out the stored histograms. The controller 220 can determine whether a peak is present (or just spurious noise) and if it is present, calculate its position. The position corresponds to the time of flight of photons to the target. Noise sources include non-correlated photons (from ambient light or from other emitters) as well as thermal emissions from the SPAD (dark counts) as well avalanches due to tunneling or after-pulsing. Some non-correlated signals have a Poisson distribution in time and therefore the variance of their inter-arrival times equals the mean inter-arrival time. This corresponds to a shot noise on the histogram. In order to attain a sufficient confidence level in identifying a signal peak and determining its position with acceptable precision, a signal-to-noise threshold is achieved (e.g., 10). The noise may be approximated as the square root of the variance (or mean background counts). One way to increase the signal to background ratio is to route the times of arrival from multiple pixels to a single histogram memory array. This increase both the signal counts and background counts but the signal-to-noise is improved. This provides a better estimate of the peak position (the peak can either be calculated by identifying the bin with the largest number of counts, or by interpolating its position with sub-bin resolution, by apriori information of the shape of the expected distribution—that shape being the convolution of the laser pulse shape and the histogram bin shape). In some embodiments, signals from multiple pixels are combined. This can result in better SNR, higher sensitivity to identify a signal, and better temporal localization of the peak (at the expense of reduced spatial resolution).

In the above manner, the DCA 200 can determine depth information for specific regions of the local area over different time windows, and at potentially different levels of resolution. The selectivity of what locations depth information is determined for as well as levels of resolution for that depth determination provides may provide reduced power/bandwidth requirements relative to conventional ToF depth systems. Moreover, by being able to dynamically vary levels of resolution of depth information for different regions, the DCA 200 is able to match resolution of depth information (and by extension use of DCA resources) to importance of objects in a local area 240.

The DCA 200 (e.g., via the controller 220) may provide the depth information to a device in which the DCA 200 is coupled to and/or integrated into (e.g., the headset 100, a console, etc.). The device may utilize the depth information to, e.g., generate content for presentation on a display.

Figure 3A:
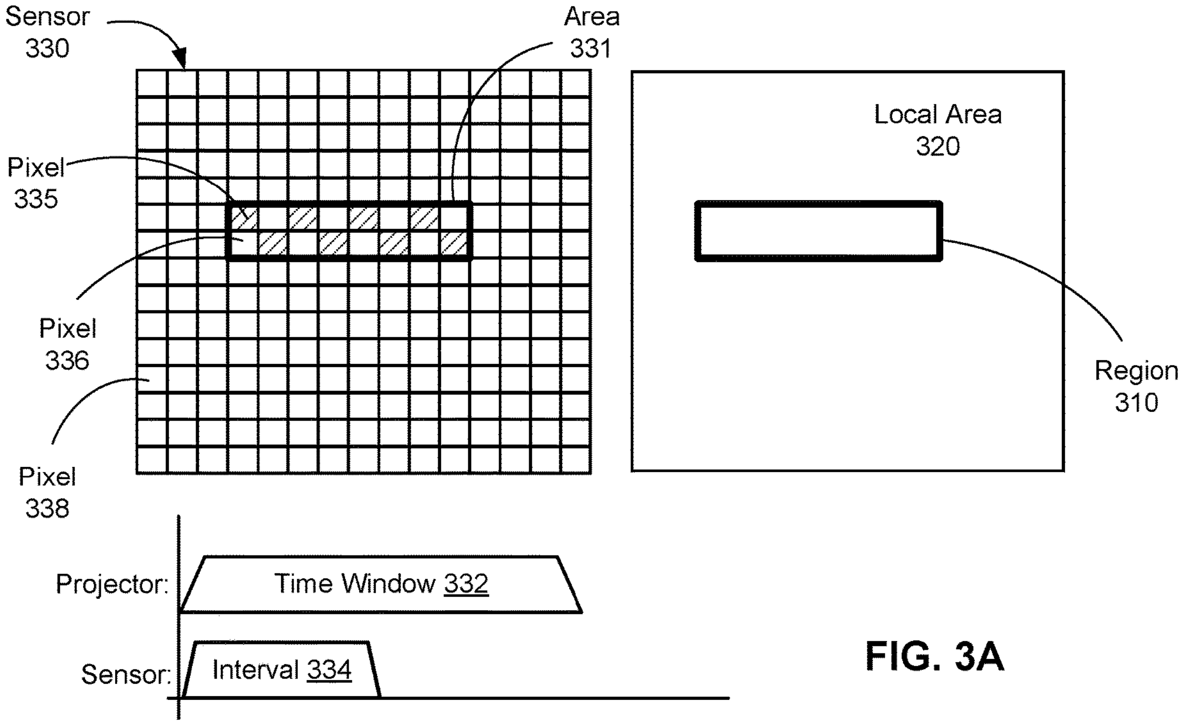
FIG. 3A illustrates example operation of a depth camera assembly collecting light from a portion of a region of a local area, according to one or more embodiments.

FIG. 3A illustrates example operation of a DCA collecting light from a portion of a region 310 of a local area 320, according to one or more embodiments. The DCA may be an embodiment of the DCA 200. As illustrated the DCA illuminates the region 310 with one or more pulses of light, and a portion of the sensor 330 of the DCA detects light from the region 310. Note while the sensor 330 is shown as a 15×15 array of pixels. In other embodiments it may have some other number of pixels, some other geometry, etc. In some embodiment, each pixel is simply a single light sensor. In other embodiments, each pixel is a macro-pixel that includes a plurality of light sensors.

As illustrated a number (e.g., 8) of pixels in a subset of active pixels is less than a number of total pixels (e.g., 16) in the area 331. The number may be based in part on a restriction of the sensor 330 that determines a maximum number of pixels (or macro-pixels) that may be active for a given time period. In other embodiments, the number may be passed in part on a power budget of the DCA.

A projector (e.g., the transmitter 250) illuminates the region 310 for a time window 332. Light reflected from the local area 320 is incident over a area 331 of the sensor 330. As shown, a first subset of the pixels (e.g. light sensors) of the sensor 330 are active within the area 331 during the an interval 334 of the time window 332, and pixels outside of the subset are inactive (e.g., pixel 338 and the pixel 336). For example, in this example, the area 331 includes 16 pixels, with 8 active pixels (e.g., pixel 335) and 8 inactive pixels (e.g., pixel 336). Within the area 331, the active pixels form a checkerboard pattern and the inactive pixels form an inverse of the checkerboard pattern. Accordingly, the sensor 330 is detecting light for a portion of the region 310 whose reflected light is captured by the subset of active pixels. Which as shown is approximately 50% of the region 310. Note in other embodiments, the number and/or arrangement of active pixels and/or inactive pixels may be different from what is illustrated.

Figure 3B:
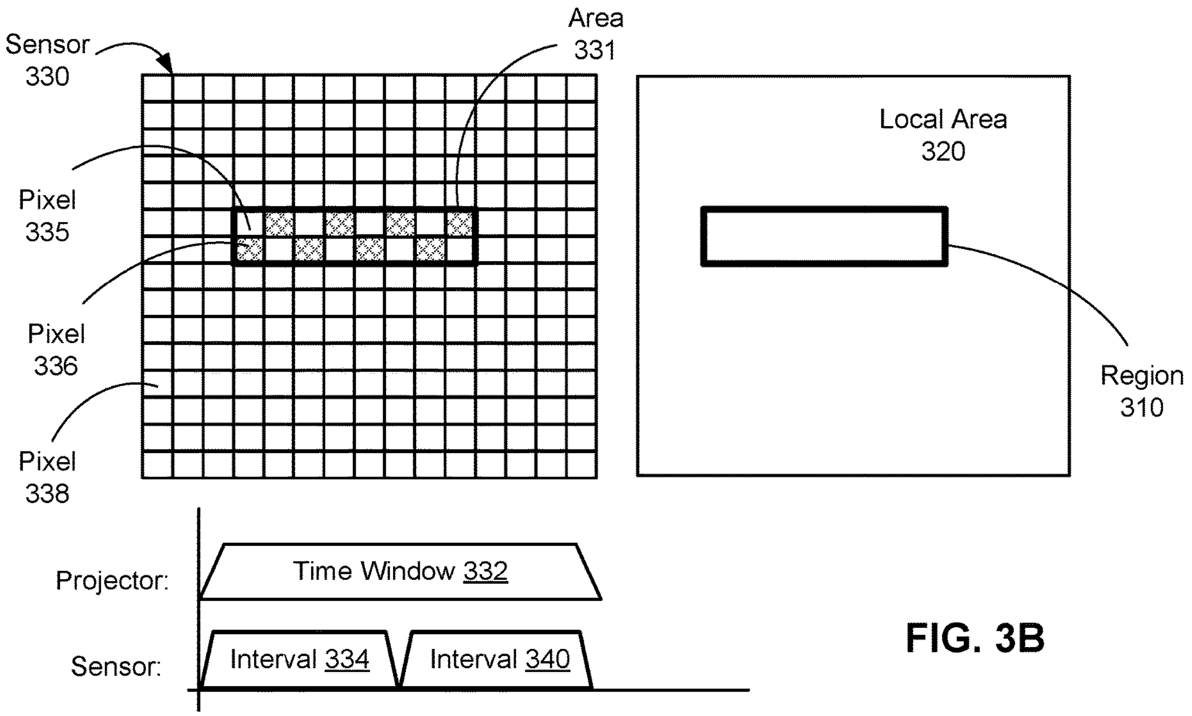
FIG. 3B illustrates example operation of the depth camera assembly of FIG. 3A collecting light from a different portion of the region.

FIG. 3B illustrates example operation of the DCA of FIG. 3A collecting light from a different portion of the region 310. As shown the sensor 330 is using a different subset of plurality of pixels within the area 331 to detect light from the region 310. As shown, a second subset of the pixels of the sensor 330 are active within the area 331 during the an interval 340 of the time window 332, and pixels outside of the different subset are inactive (e.g., pixel 338, and the pixel 335). Note that the active pixels within the area 331 in FIG. 3A are inactive in FIG. 3B (e.g., the pixel 335), and the inactive pixels within the area 331 in FIG. 3A are active in FIG. 3B (e.g., the pixel 336). Accordingly, there is no overlap in the portion of the region 310 from which light is detected from in FIG. 3A relative to the portion of the region 310 from which light is detected from in FIG. 3B.

In the illustrated embodiment, light from different portions of the region 310 is detected by the first and second subset of pixels. A controller of the DCA may determine depth information using the light from the different portions of the region 310. Note that by using light from multiple portions of the region 310, the controller is able to control a level of resolution of the depth information for the region 310.

Note that in some embodiments, the DCA is able to provide depth information at levels higher than that show in FIGS. 3A and 3B. For example, as noted above, in some embodiments, the pixels are macro pixels (i.e., an array of light sensors). For example, assuming a macro-pixel is a 4×4 array of light sensors, for a given time window, the DCA may detect light using the same subsets shown in FIGS. 3A and 3B, but may also include additional subsets of light sources where the checkerboard pattern is shifted by one or more light sources in any direction. For example, in this embodiment, the checkerboard pattern may be shifted 2 pixels (i.e., half a macro pixel) to the right, thereby providing a configuration to capture light from a different portion of the region 310. Moreover, there would be some overlap in the portions of the region 310 from which light is detected from for different time intervals.

Figure 3C:
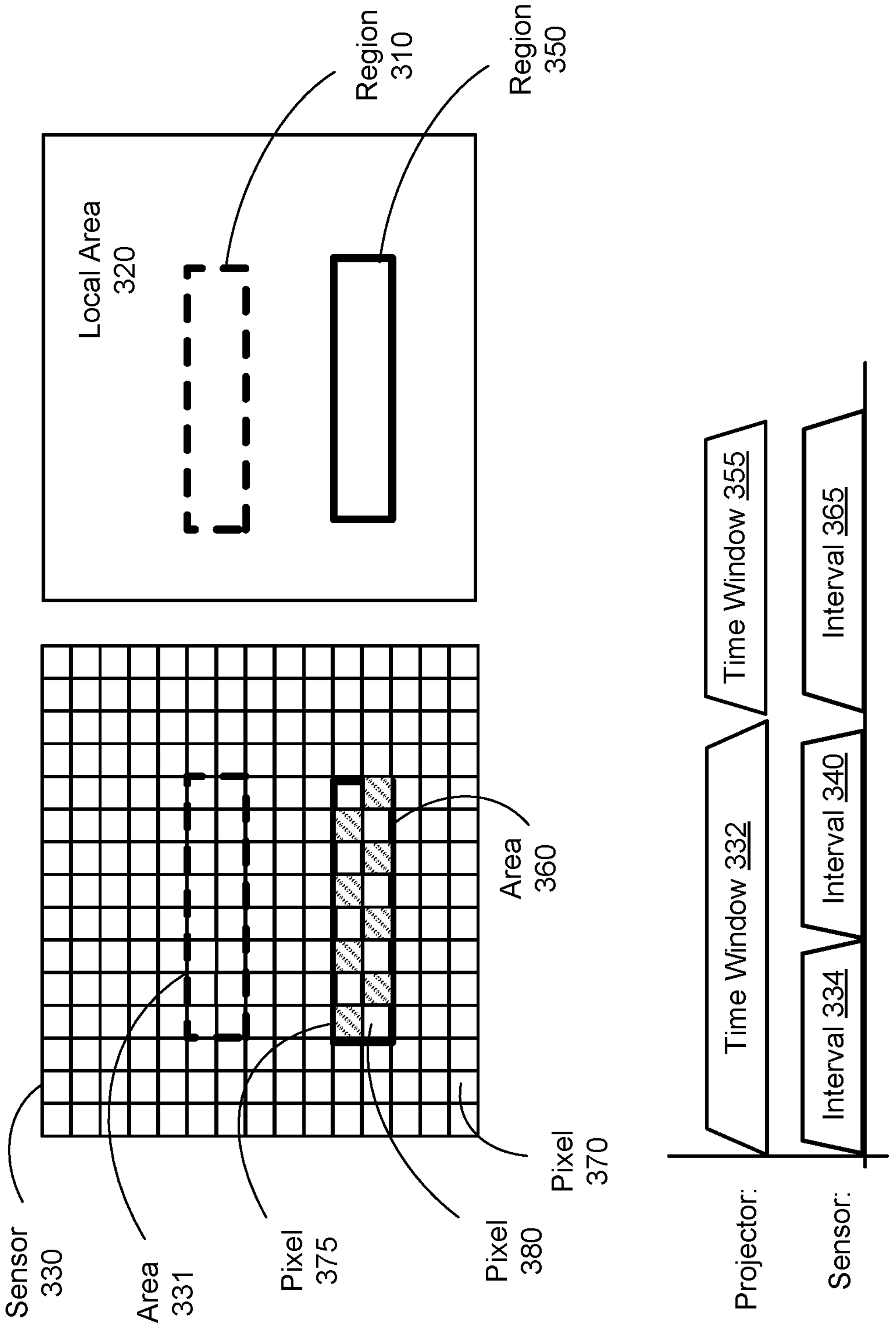
FIG. 3C illustrates example operation of the depth camera assembly of FIG. 3A collecting light from a portion of a different region of the local area.

FIG. 3C illustrates example operation of the depth camera assembly of FIG. 3A collecting light from a portion of a different region 350 of the local area 320. As illustrated, the projector illuminates the region 350 for a time window 355. Light reflected from the local area 320 is incident over an area 360 of the sensor 330. As shown, a subset of the pixels (e.g. light sensors) of the sensor 330 are active within the area 360 during an interval 365 of the time window 355, and pixels outside of the subset are inactive (e.g., pixel 370 and pixel 380). For example, in this example, the area 360 includes 16 pixels, with 8 active pixels (e.g., pixel 375) and 8 inactive pixels (e.g., the pixel 380). Within the area 360, the active pixels form a checkerboard pattern and the inactive pixels form an inverse of the checkerboard pattern. Accordingly, the sensor 330 is detecting light for a portion of the region 350 whose reflected light is captured by the subset of active pixels. Which as shown is approximately 50% of the region 310. Note in other embodiments, the number and/or arrangement of active pixels and/or inactive pixels may be different from what is illustrated.

In the illustrated embodiment, light from the portion of the region 350 is detected by the subset of pixels. The controller may determine depth information using the detected light. Note that the determined depth information is determined using light from a small portion of the region 350 relative to the depth information determined for the region 310, resulting in a lower resolution than a resolution of the depth information determined for the region 310. However, the depth information determined for the region 350 is determined using a single subset of pixels (i.e., one time interval versus multiple time intervals for a given time window), resulting in faster depth determination for the region 350 than the region 310. In this manner, the DCA is able to control which regions depth information is determined for, a level of resolution for determined depth information, as well as how fast the depth information is acquired and determined.

Figure 4:
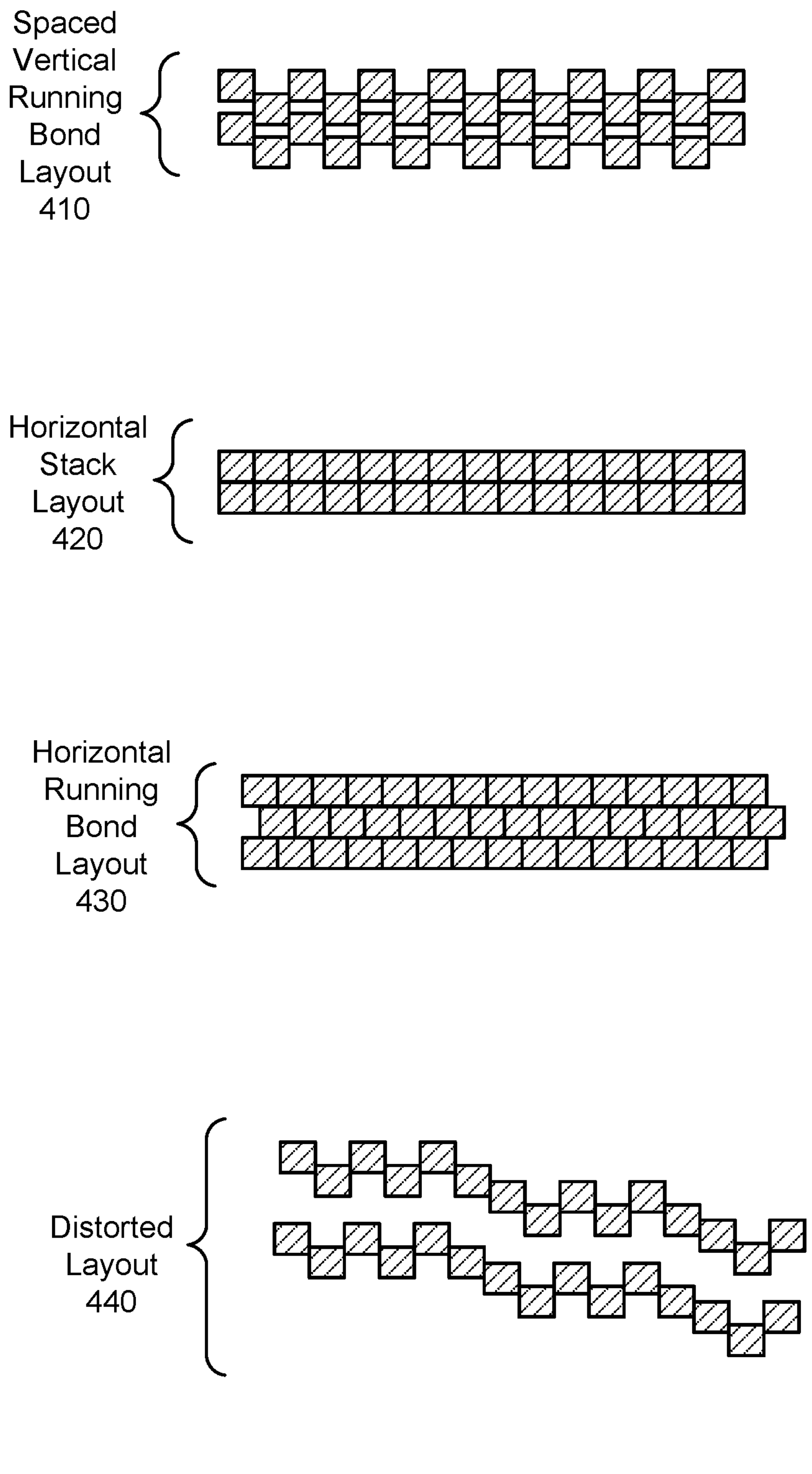
FIG. 4 illustrates example layouts of pixels of a sensor of a depth camera assembly, in accordance with one or more embodiments.

FIG. 4 illustrates example layouts of pixels of a sensor of a depth camera assembly, in accordance with one or more embodiments. The sensor may be a sensor of the DCAs described above with reference to FIGS. 1-3C. Shown here are four example layouts for the pixels, a spaced vertical running bond layout 410, a horizontal stack layout 420, a horizontal running bond layout 430, and a distorted layout 440. Note in other embodiments, the number of pixels in one or more of the layouts may differ. Additionally, the sensor may use some other layout of pixels than what is shown in FIG. 4.

Figure 5:
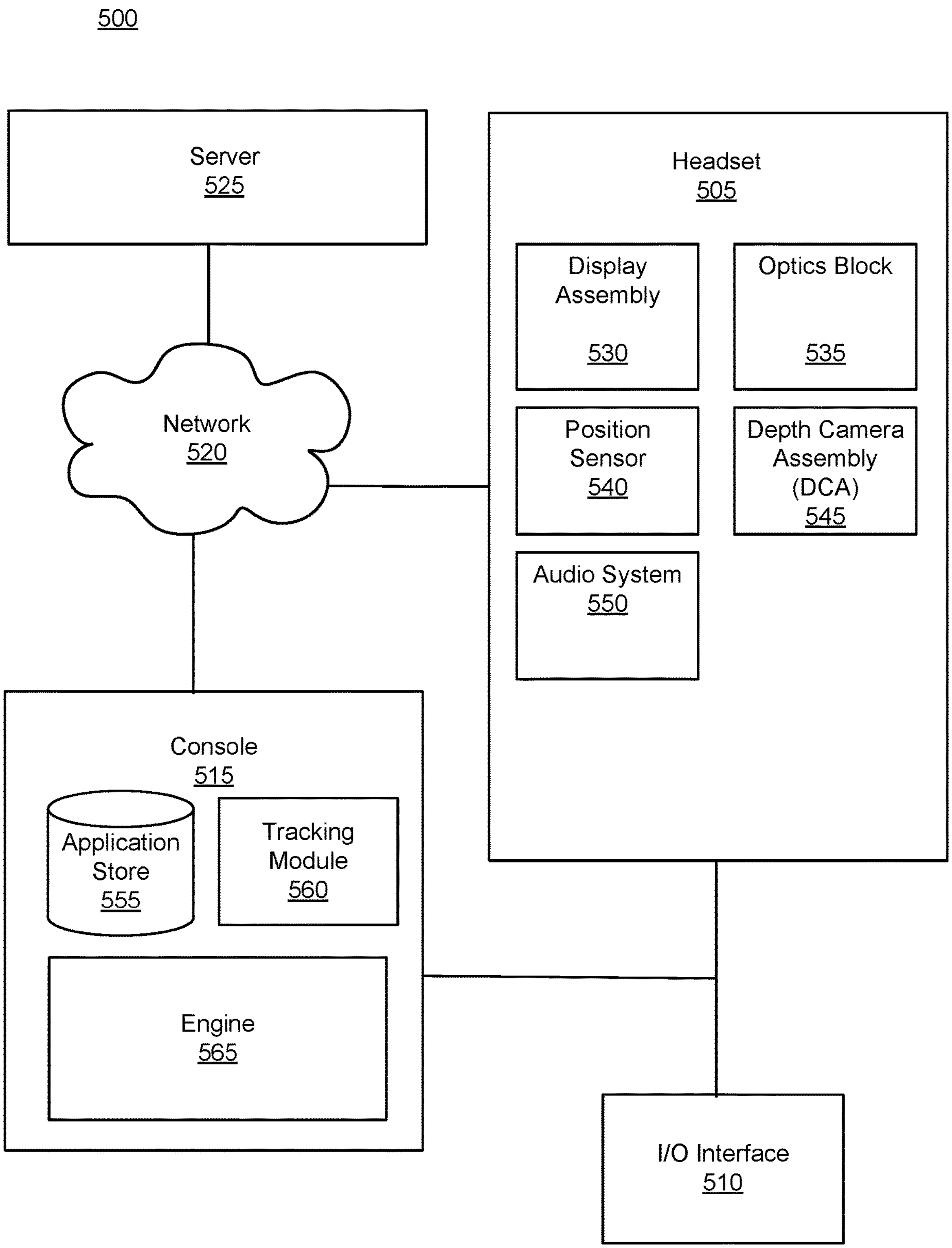
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes a projector (e.g., the transmitter 250), a camera assembly (e.g., the receiver 270), and a controller (e.g., the controller 220). As noted previously, the DCA 545 is able to dynamically illuminate different regions of the local area. The DCA 545 can also determined different levels of depth information for different regions of the local area. Operation and structure of the DCA 545 is described above with regard to FIGS. 1-4.

The audio system 550 provides audio content to a user of the headset 505. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface

510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server 525 may include a database that stores a virtual model describing a plurality of spaces, wherein one location in the virtual model corresponds to a current configuration of a local area of the headset 505. The server 525 receives, from the headset 505 via the network 520, information describing at least a portion of the local area and/or location information for the local area. The user may adjust privacy settings to allow or prevent the headset 505 from transmitting information to the server 525. The server 525 determines, based on the received information and/or location information, a location in the virtual model that is associated with the local area of the headset 505. The server 525 determines (e.g., retrieves) one or more acoustic parameters associated with the local area, based in part on the determined location in the virtual model and any acoustic parameters associated with the determined location. The server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers (e.g., the server 525) for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

illuminating a first region of a local area;

selecting a first subset of a plurality of light sensors, the first subset of the plurality of light sensors configured to detect light from the first region of the local area and light sensors not in the first subset are inactive;

detecting light from a first portion of the first region of the local area using the first subset of the plurality of light sensors;

determining depth information for the first region based in part on the detected light from the first portion of the first region;

selecting a second subset of the plurality of light sensors, the second subset of the plurality of light sensors configured to detect light from the first region and light sensors not in the second subset are inactive; and detecting light from a second portion of the first region of the local area using the second subset of the plurality of light sensors, wherein determining the depth information for the first region based in part on the detected light from the first portion of the first region is also based in part on the detected light from the second portion of the first region.

2. The method of claim 1, wherein the first portion and the second portion are different portions of the first region that do not overlap.

3. The method of claim 1, wherein the first portion and the second portion are different portions of the first region with some overlap.

4. The method of claim 1, wherein the first portion forms a checkerboard pattern and the second portion forms an inverse of the checkerboard pattern.

5. The method of claim 1, wherein a number of light sensors in a subset is less than a number of light sensors in the plurality of light sensors, and the number is based in part on a restriction of a sensor that includes the plurality of light sensors.

6. The method of claim 1, wherein a number of light sensors in a subset is less than a number of light sensors in the plurality of light sensors, and the number is based in part on a power budget of the depth camera assembly.

7. A non-transitory computer-readable storage medium comprising stored instructions, the instructions when executed by a processor of a depth camera assembly (DCA), causing the DCA to:

illuminate a first region of a local area;

select a first subset of a plurality of light sensors, the first subset of the plurality of light sensors configured to detect light from the first region of the local area and light sensors not in the first subset are inactive;

detect light from a first portion of the first region of the local area using the first subset of the plurality of light sensors;

determine depth information for the first region based in part on the detected light from the first portion of the first region;

selecting a second subset of the plurality of light sensors, the second subset of the plurality of light sensors configured to detect light from the first region and light sensors not in the second subset are inactive, detecting light from a second portion of the first region of the local area using the second subset of the plurality of light sensors, wherein the determination of the depth information for the first region based in part on the detected light from the first portion of the first region is also based in part on the detected light from the second portion of the first region.

8. The non-transitory computer-readable storage medium of claim 7, wherein the first portion and the second portion are different portions of the first region that do not overlap.

9. The non-transitory computer-readable storage medium of claim 7, further wherein the first portion and the second portion are different portions of the first region with some overlap.

10. The non-transitory computer-readable storage medium of claim 7, wherein the first portion forms a checkerboard pattern and the second portion forms an inverse of the checkerboard pattern.

11. The non-transitory computer-readable storage medium of claim 7, wherein a number of light sensors in a subset is less than a number of light sensors in the plurality of light sensors, and the number is based in part on a restriction of a sensor that includes the plurality of light sensors.

12. The non-transitory computer-readable storage medium of claim 7, wherein a number of light sensors in a subset is less than a number of light sensors in the plurality of light sensors, and the number is based in part on a power budget of the depth camera assembly.

13. A depth camera assembly (DCA) comprising:

a projector configured to dynamically illuminate one or more regions of a local area;

a sensor configured to detect light from the illuminated one or more regions of the local area using one or more subsets of a plurality of light sensors; and a controller configured to:

instruct the projector to illuminate a first region of the local area, determine a first subset of the one or more subsets of the plurality of light sensors, instruct the sensor to use the first subset of the plurality of light sensors to detect light, wherein the first subset of the plurality of light sensors captures light from a first portion of the first region of the local area, determine depth information for the first region based in part on the detected light from the first portion of the first region;

select a second subset of the plurality of light sensors, the second subset of the plurality of light sensors configured to detect light from the first region and light sensors not in the second subset are inactive;

instruct the sensor to detect light from a second portion of the first region of the local area using the second subset of the plurality of light sensors; and wherein the determination of the depth information for the first region based in part on the detected light from the first portion of the first region is also based in part on the detected light from the second portion of the first region.

14. The DCA of claim 13, wherein the first subset of the plurality of light sensors forms a checkerboard pattern and the remaining sensors of the plurality of light sensors form an inverse of the checkerboard pattern.

15. The DCA of claim 13, wherein a number of light sensors in a subset is less than a number of light sensors in the plurality of light sensors, and the number is based in part on a restriction of the sensor.

* * * * *